US011639077B2

(12) United States Patent
Gau et al.

(10) Patent No.: US 11,639,077 B2
(45) Date of Patent: *May 2, 2023

(54) TIRE WITH TREAD WEAR SENSOR PLUG

(71) Applicant: The Goodyear Tire & Rubber Company, Akron, OH (US)

(72) Inventors: Jin-Shy Steve Gau, Hudson, OH (US); James Earl Koerner, Uniontown, OH (US); Peter Jung-Min Suh, Stow, OH (US); Junling Zhao, Hudson, OH (US); Jeffrey McKay West, Uniontown, OH (US); Andrew Peter Killmeyer, Macedonia, OH (US); Frank George Licari, Solon, OH (US); Michael William Kestner, Canton, OH (US); Arun Kumar Byatarayanapura Gopala, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/502,074

(22) Filed: Oct. 15, 2021

(65) Prior Publication Data

US 2022/0185029 A1 Jun. 16, 2022

Related U.S. Application Data

(60) Provisional application No. 63/125,435, filed on Dec. 15, 2020.

(51) Int. Cl.
*B60C 11/24* (2006.01)
*B60C 19/00* (2006.01)

(52) U.S. Cl.
CPC ............ *B60C 11/243* (2013.01); *B60C 19/00* (2013.01); *B60C 2019/004* (2013.01)

(58) Field of Classification Search
None
See application file for complete search history.

(56) References Cited

U.S. PATENT DOCUMENTS 6,443,198 B1 9/2002 Koch et al.
6,444,069 B1 9/2002 Koch et al.
(Continued)

FOREIGN PATENT DOCUMENTS

DE 19745734 A1 4/1999
DE 20216290 U1 1/2003
(Continued)

OTHER PUBLICATIONS

Extended European Search Report received by applicant dated May 18, 2022.

*Primary Examiner* — Andre J Allen
*Assistant Examiner* — Jermaine L Jenkins
(74) *Attorney, Agent, or Firm* — Edward T. Kennedy

(57) ABSTRACT

A tire includes a pair of sidewalls extending from a respective bead area to a tread. The tread is formed with a plurality of tread elements and a radially outer surface. A sensor unit is mounted to the tire and includes a pair of electrical contacts. The tread wear sensor plug includes a cylindrical projection extending through an opening formed in one of the tread elements, a flange, and a wire including proximal ends disposed in the flange and a distal end near a radially outer surface of the projection. An electrical circuit is formed by each proximal end of the wire electrically contacting a respective one of the sensor unit electrical contacts. When the tread element and the cylindrical projection wear down to the distal end of the wire, the wire and the circuit break. A notice is transmitted by the sensor unit when the circuit breaks.

13 Claims, 5 Drawing Sheets

(56) References Cited

U.S. PATENT DOCUMENTS

| | | | |
|---|---|---|---|
| 6,546,982 | B1 | 4/2003 | Brown et al. |
| 6,885,291 | B1 | 4/2005 | Pollack et al. |
| 6,889,153 | B2 | 5/2005 | Dietiker |
| 7,280,036 | B2 | 10/2007 | Kafrawy |
| 7,334,462 | B2 * | 2/2008 | Robert .................... B60C 11/24 |
| | | | 73/146 |
| 8,596,117 | B2 | 12/2013 | Wilson et al. |
| 8,996,239 | B2 | 3/2015 | Orlewski |
| 9,016,118 | B2 | 4/2015 | Townsend et al. |
| 9,283,817 | B2 | 3/2016 | Sandstrom et al. |
| 9,352,615 | B2 | 5/2016 | Djelloul-mazouz et al. |
| 9,649,889 | B2 | 5/2017 | Engel et al. |
| 2007/0245819 | A1 | 10/2007 | Robert |
| 2014/0365069 | A1 * | 12/2014 | Orlewski ............ B60C 11/0302 |
| | | | 73/146 |
| 2019/0184773 | A1 | 6/2019 | Saito |
| 2019/0359010 | A1 * | 11/2019 | Setokawa ............. B60C 11/243 |
| 2020/0047566 | A1 | 2/2020 | Kim et al. |
| 2022/0088972 | A1 * | 3/2022 | Setokawa ............. B60C 11/246 |
| 2022/0185033 | A1 * | 6/2022 | West ................... B60C 23/0493 |

FOREIGN PATENT DOCUMENTS

| | | |
|---|---|---|
| DE | 102007001279 A1 | 7/2008 |
| DE | 102010000003 A1 | 7/2011 |
| JP | 2005028950 A | 2/2005 |
| KR | 102124829 B1 | 6/2020 |

* cited by examiner

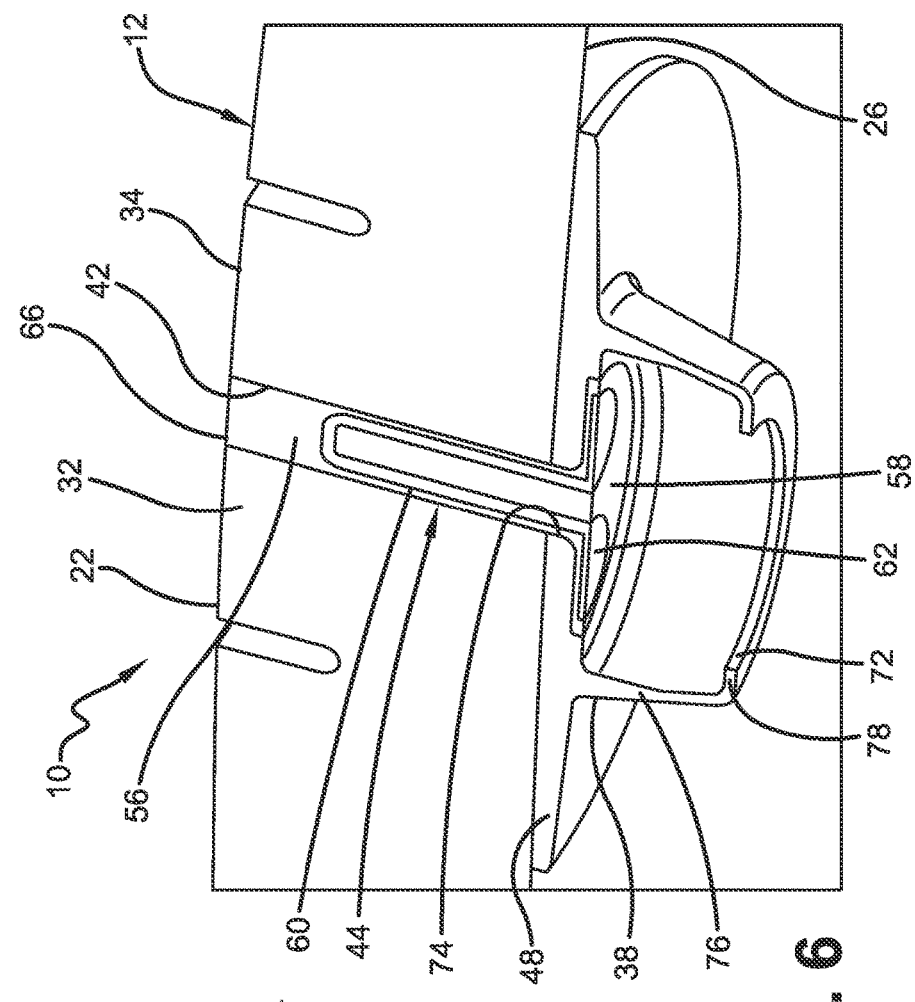
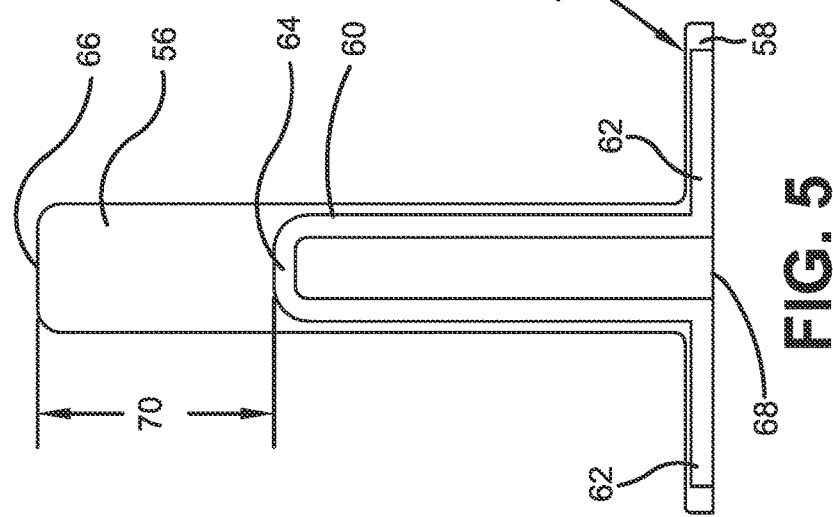

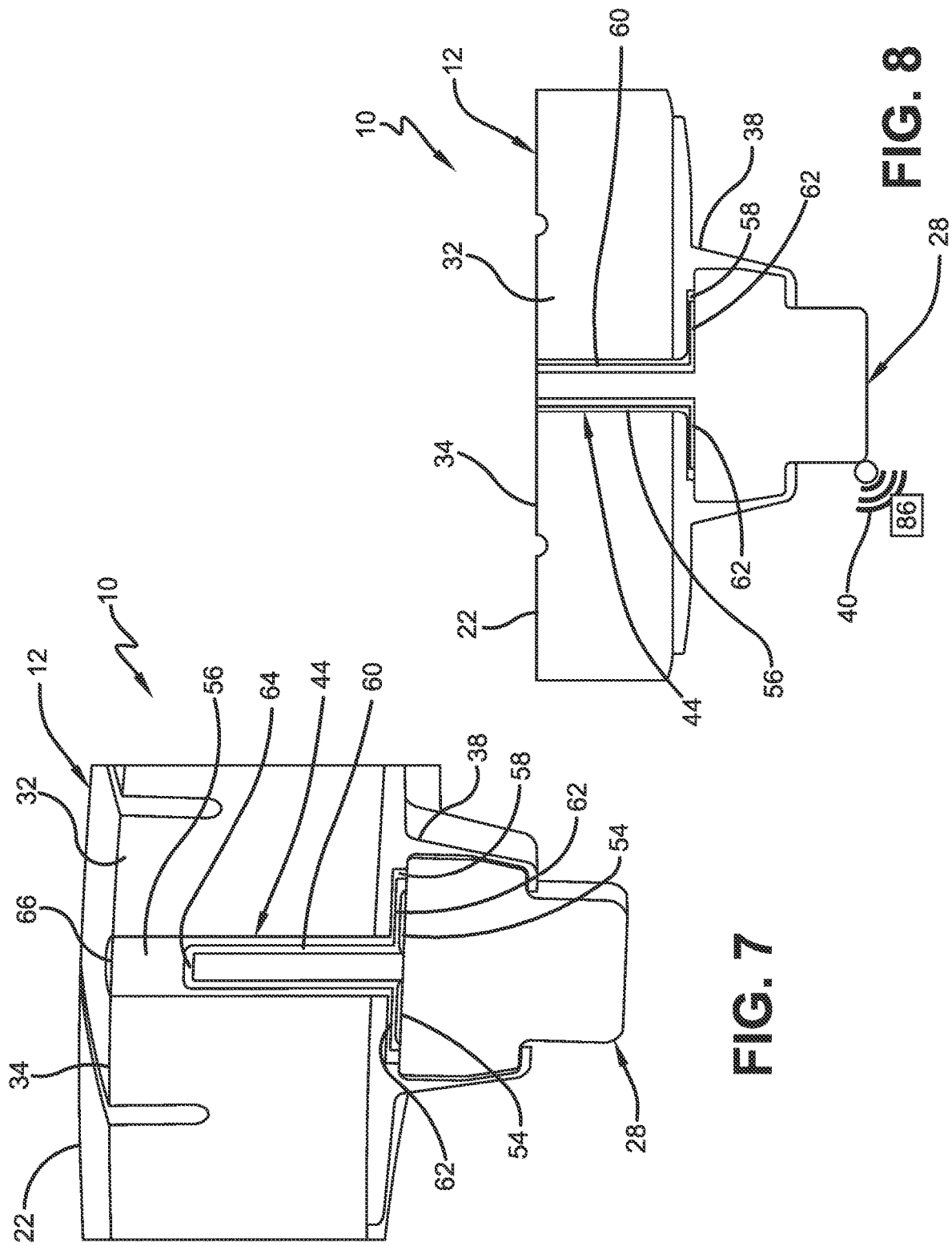

TIRE WITH TREAD WEAR SENSOR PLUG

FIELD OF THE INVENTION

The invention relates to vehicle tires. More particularly, the invention relates to vehicle tires with sensors that determine various conditions within the tires. Specifically, the invention is directed to a tire with a tread wear sensor plug that provides a direct wear sensor system for the tire.

BACKGROUND OF THE INVENTION

In the manufacture of a pneumatic tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

The use of tread wear indicators that are formed on a tire tread before or after curing is known in the art. For example, prior art mechanical tread wear indicators include color indicia disposed below certain tread elements, tie bars disposed in the tread grooves, or characters formed in the tread elements, all of which provide a visual indicator of wear. Such mechanical indicators may be difficult for a vehicle operator to see, and thus do not easily provide information to the operator.

In addition, it is often desirable to collect electronic data for the wear state of the tire. The data can be communicated to electronic systems of the vehicle, such as vehicle stability and/or braking systems, in order to provide improved control of the vehicle and to monitor or track driving behavior. Mechanical tread wear indicators are not able to provide such data to electronic systems of the vehicle.

To provide an indication of tire wear to vehicle electronic systems, prior art indirect wear estimation techniques were developed. Such techniques involve estimation of tire wear through certain tire and vehicle parameters, rather than direct measurement of wear. For example, tire pressure, tire temperature, vehicle speed, vehicle mileage, vehicle acceleration and other parameters may be employed to estimate tire wear. Such indirect estimation of tire wear can be difficult to perform accurately, and typically involves complex modeling techniques.

In order to provide a wear indication to vehicle electronic systems based on a direct measurement of tire wear, prior art electronic wear sensors were developed. Such sensors are known in the art as direct wear sensors, as they attempt to directly measure tire wear, rather than providing an estimate from indirect means. By way of example, prior art direct wear sensors include resistance-based electronic sensors that typically are incorporated into tread elements of tires. As the tread element wears, resistors in the sensor also wear, leading to a change in the electrical resistance of the sensor. By measuring the resistance of the sensor and transmitting the measured resistance data to a processor, wear of the tread can be determined.

While prior art direct wear sensors are acceptable for their intended purpose, many such sensors are difficult to install in the tire. Other direct wear sensors cannot withstand the harsh operating environment of the tire for a prolonged period, such as the recommended life of the tire. Still other direct wear sensors are not capable of maintaining precise and repeatable indication of tire wear over the recommended life of the tire.

As a result, it is desirable to develop a direct wear sensor system for a vehicle tire that includes a structure which is easy to install in the tire, withstands the operating environment of the tire, accurately indicates tire wear in a repeatable manner, and is capable of transmitting a wear indication to an electronic control system of the vehicle.

SUMMARY OF THE INVENTION

According to an aspect of an exemplary embodiment of the invention, a tire with a tread wear sensor plug is provided. The tire includes a pair of sidewalls, each one of which extends radially outwardly from a respective bead area to a ground-contacting tread. The tread is formed with a plurality of tread elements and a radially outer surface. A sensor unit is mounted to the tire and includes a pair of electrical contacts. The tread wear sensor plug includes a cylindrical projection extending through an opening formed in a selected one of the tread elements, a flange, and a wire including proximal ends disposed in the flange and a distal end near a radially outer surface of the projection. An electrical circuit is formed by each proximal end of the wire electrically contacting a respective one of the sensor unit electrical contacts to form an electrical circuit. When the selected one of the tread elements and the cylindrical projection wear down to the distal end of the wire, the distal end of the wire breaks, which breaks the electrical circuit. A notice is transmitted by the sensor unit when the electrical circuit has broken.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"CAN bus" is an abbreviation for controller area network.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Equatorial plane (EP)" means the plane perpendicular to the tire's axis of rotation and passing through the center of its tread.

"Footprint" means the contact patch or area of contact created by the tire tread with a flat surface, such as the ground, as the tire rotates or rolls.

"Inboard side" means the side of the tire nearest the vehicle when the tire is mounted on a wheel and the wheel is mounted on the vehicle.

"Innerliner" means the layer or layers of elastomer or other material that form the inside surface of a tubeless tire and that contain the inflating fluid within the tire.

"Lateral" means an axial direction.

"Lateral edges" means a line tangent to the axially outermost tread contact patch or footprint as measured under normal load and tire inflation, the lines being parallel to the equatorial centerplane.

"Outboard side" means the side of the tire farthest away from the vehicle when the tire is mounted on a wheel and the wheel is mounted on the vehicle.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"TPMS" means a tire pressure monitoring system, which is an electronic system that measures the internal pressure of a tire and is capable of communicating the pressure to a processor that is mounted on the vehicle and/or is in electronic communication with electronic systems of the vehicle.

"Tread element" or "traction element" means a rib or a block element defined by a shape having adjacent grooves.

BRIEF DESCRIPTION OF DRAWINGS

The invention will be described by way of example and with reference to the accompanying drawings, in which:

FIG. 5 is a cross-sectional view of the tread wear plug employed in the exemplary embodiment of the tire with a tread wear sensor plug of the present invention;

FIG. 6 is a cross-sectional perspective view of the tread wear plug shown in FIG. 5 installed in the tire shown in FIG. 2;

FIG. 7 is a cross-sectional perspective view of the tread wear plug shown in FIG. 5 installed in the tire shown in FIG. 2, with the tire in an unworn state; and FIG. 8 is a cross-sectional perspective view of the tread wear plug shown in FIG. 5 installed in the tire shown in FIG. 2, with the tire in a worn state.

Similar numerals refer to similar parts throughout the drawings.

DETAILED DESCRIPTION OF THE INVENTION

Figure 1:
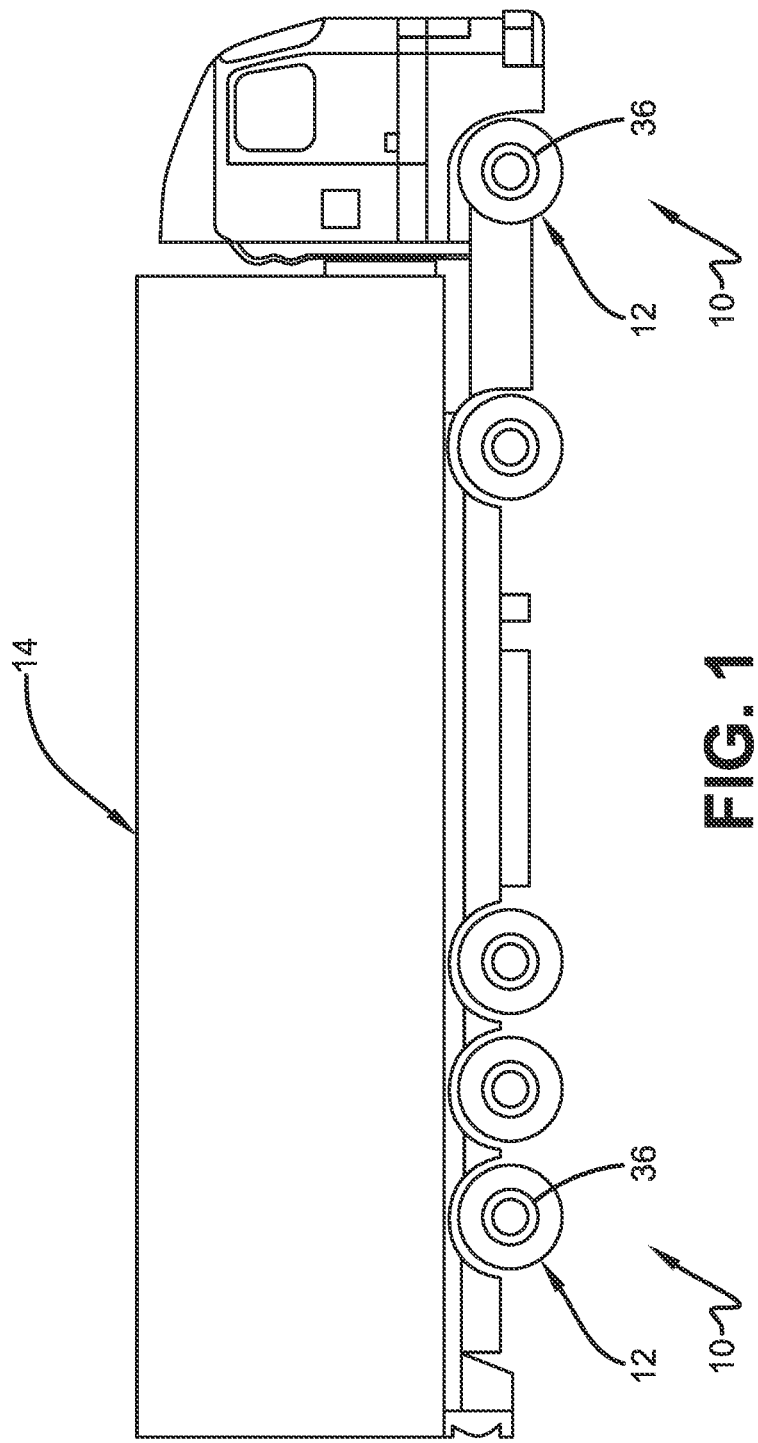
FIG. 1 is a schematic side view of a vehicle with tires that include an exemplary embodiment of the tire with a tread wear sensor plug of the present invention.

A first exemplary embodiment of the tire with a tread wear sensor plug of the present invention is indicated at 10 in FIGS. 1 through 8. With particular reference to FIG. 1, the tire with a tread wear sensor plug 10 includes a tire 12, and provides a system for indicating the wear on one or more tires supporting a vehicle 14. While the vehicle 14 is depicted as a commercial truck, the invention is not to be so restricted. The principles of the invention find application in other vehicle categories, such as passenger vehicles, off-the-road vehicles and the like, in which vehicles may be supported by more or fewer tires than shown in FIG. 1.

Figure 2:
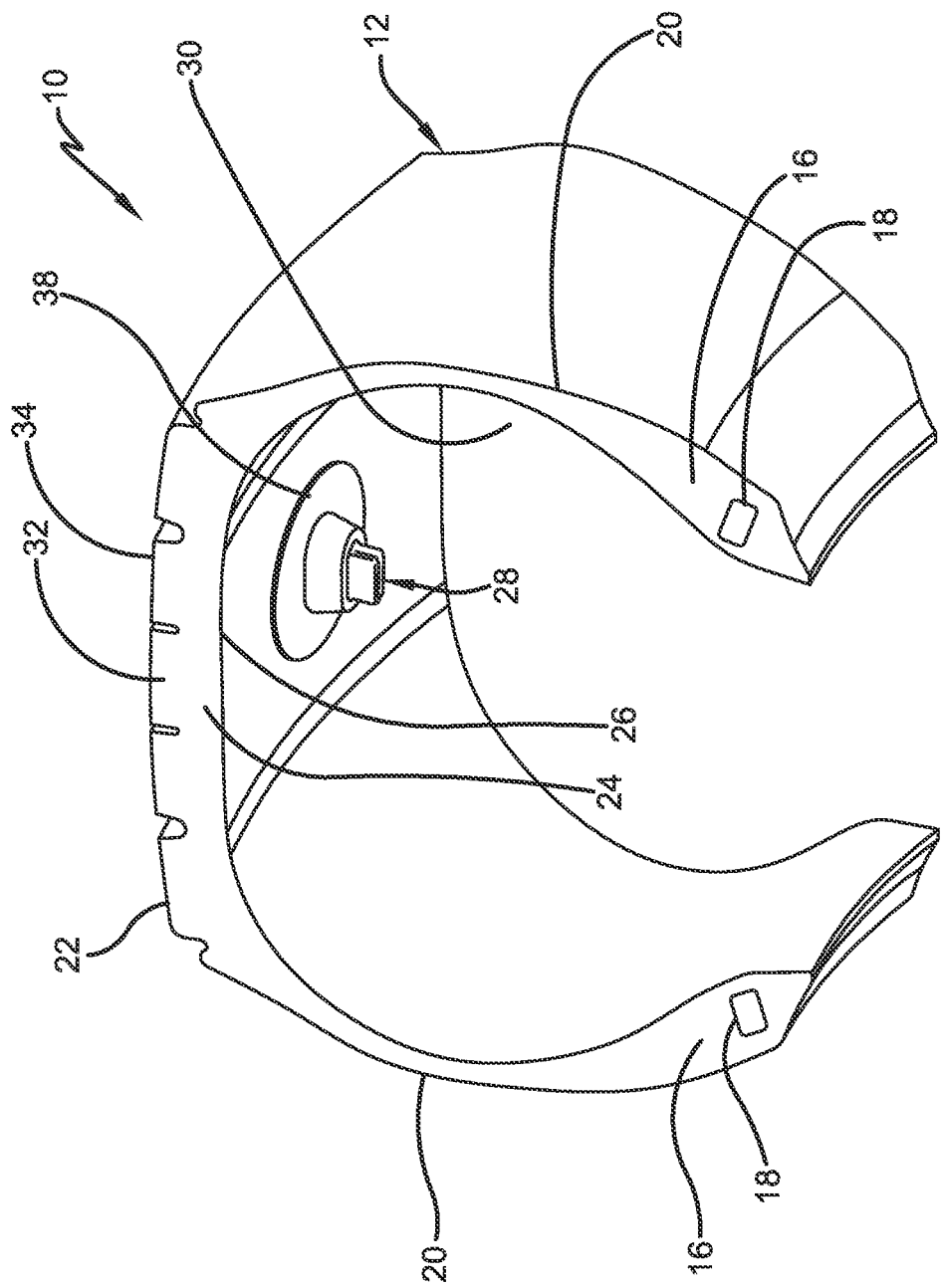
FIG. 2 is a perspective cross-sectional view of a tire shown in FIG. 1, prior to installation of the tread wear sensor plug.

Turning to FIG. 2, the tire 12 includes a pair of bead areas 16, each one of which is formed with a bead core 18 that is embedded in the respective bead areas. Each one of a pair of sidewalls 20 extends radially outwardly from a respective bead area 16 to a ground-contacting tread 22. The tread 22 is formed with multiple tread elements or tread blocks 32 and includes a radially outer surface 34. The tire 12 is reinforced by a carcass 24 that toroidally extends from one bead area 16 to the other bead area, as known to those skilled in the art. An innerliner 26 is formed on the inner or inside surface of the carcass 24. The tire 12 is mounted on the flange of a wheel or rim 36 (FIG. 1) as known in the art, forming an internal cavity 30.

A sensor unit 28 preferably is mounted to the tire 12. The sensor unit 28 detects certain real-time parameters of the tire 12, and preferably includes a pressure sensor to sense the inflation pressure within a cavity 30 of the tire, and a temperature sensor to sense the temperature of the tire and/or the temperature in the cavity. The sensor unit 28 may be a commercially-available tire pressure monitoring system (TPMS) module or sensing unit.

The sensor unit 28 preferably also includes a processor and memory to store tire identification (ID) information for each specific tire 12. For example, the tire ID may include manufacturing information for the tire 12, including: the tire model; size information, such as rim size, width, and outer diameter; manufacturing location; manufacturing date; a treadcap code that includes or correlates to a compound identification; and a mold code that includes or correlates to a tread structure identification. The tire ID may also include a service history or other information to identify specific features and parameters of each tire 12.

The sensor unit 28 preferably further includes an antenna for wirelessly transmitting 40 (FIG. 8) measured parameters and tire ID data to a remote processor for analysis, such as a processor integrated into a vehicle electronic control unit and/or CAN bus.

Figure 4:
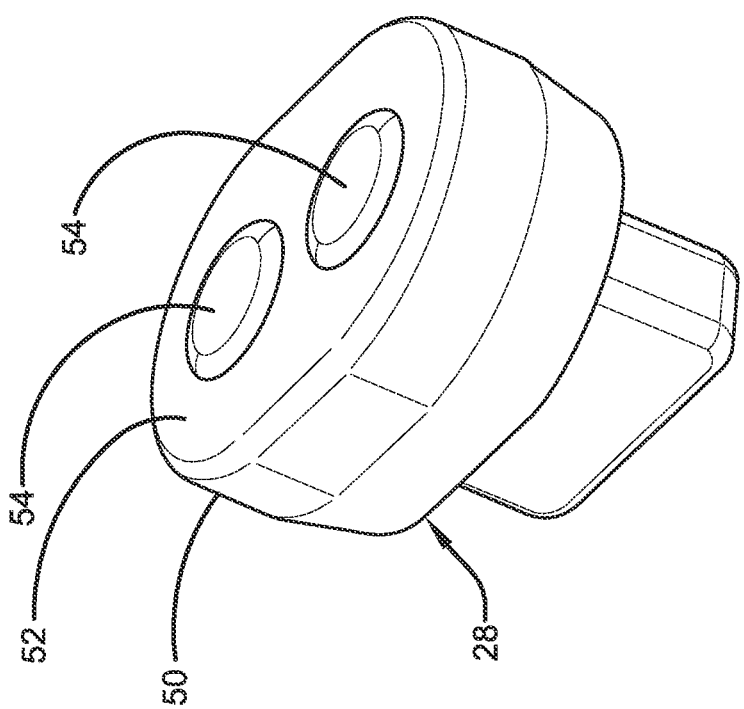
FIG. 4 is a perspective view of a TPMS sensor employed in the exemplary embodiment of the tire with a tread wear sensor plug of the present invention.
Figure 3:
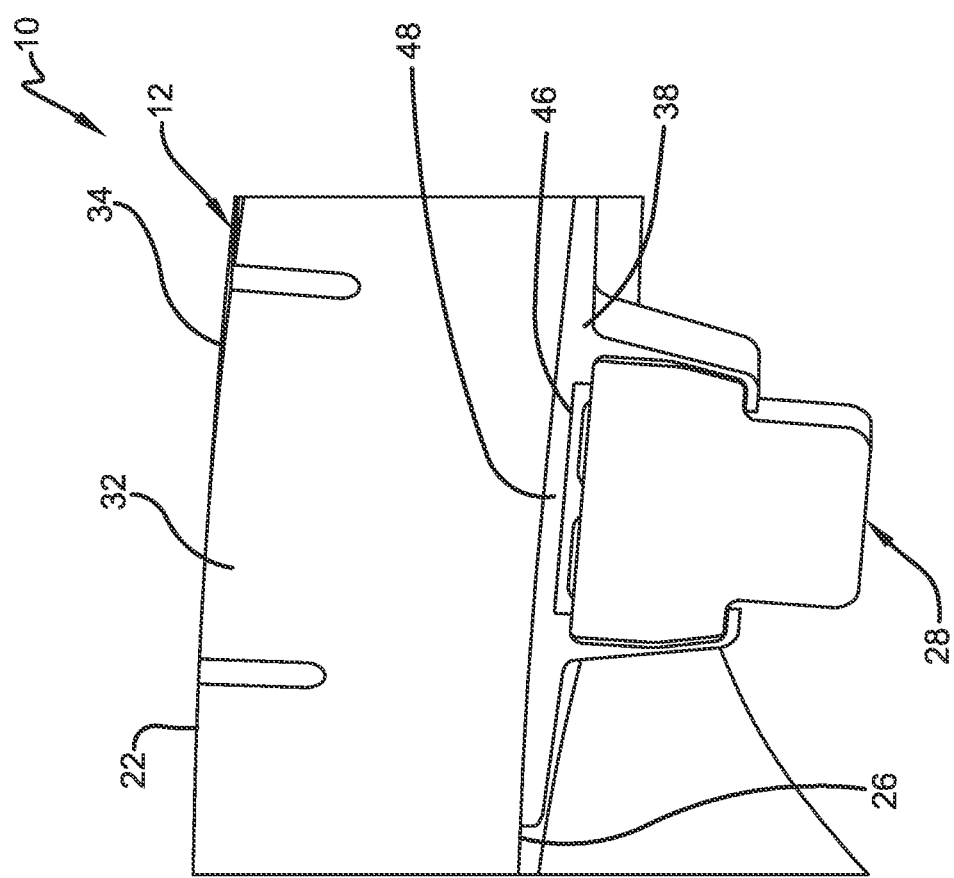
FIG. 3 is an enlarged schematic perspective view of the tire shown in FIG. 2.

Turning to FIG. 3, the sensor unit 28 may be mounted to the tire 12 using a container 38, which receives the sensor unit and is attached to the innerliner 26 by an adhesive. Preferably, the container 38 is flexible and is formed of an elastomer or polymer. The sensor unit 28 may be attached to the tire 12 before an opening 42 (FIG. 6) for a tread wear sensor plug 44 (FIG. 5) is formed in a selected tread element 32. In such a case, a removable spacer 46 preferably is disposed between the sensor unit 28 and a base 48 of the container 38, which seats against the innerliner 26. The spacer 46 enables insertion of the tread wear plug 44, as will be described in greater detail below. As shown in FIG. 4, the sensor unit 28 includes a rigid housing 50 formed with a base 52. A pair of electrical contacts 54 are mounted on the base 52 and extend through the housing 50.

Referring to FIG. 5, the tread wear plug 44 includes a cylindrical projection 56 and a flange 58. The flange 58 extends outwardly from the projection 56 to provide a base for the tread wear plug 44. A conductive wire 60 is disposed in the tread wear plug 44. The wire 60 preferably is an insulated wire, but may be an uninsulated wire, depending on particular design considerations. The wire is formed in a U-shape and thus has proximal ends 62 in the flange 58 and a distal end 64 near a radially outer surface 66 of the projection 56. The proximal ends 62 of the wire 60 extend to a bottom 68 of the flange 58 and thus the tread wear plug 44 to contact the electrical contacts 54 of the sensor unit 28, as will be described below. The distal end 64 of the wire 60 is a set distance 70 below the radially outer surface 66 of the projection 56.

Turning to FIG. 6, an opening 42 for the tread wear plug 44 is formed in a selected tread element 32. More particularly, the container 38 is formed with a sensor unit opening 72, which enables the sensor unit 28 to be removed from the container and thus removably mounted to the tire 12. An opening 74 is formed in the container base 48 in alignment with the opening 42 in the tread element 32. The aligned openings 42 and 74 pass radially from the internal cavity 30 of the tire 12 to the radially outer surface 34 of the tread 22. The openings 42 and 74 may be formed by drilling, water jet cutting, laser cutting, and the like.

The tread wear plug 44 is installed in the tire 12 before the tire is mounted on the wheel 36. The projection 56 of the tread wear plug 44 is inserted from the direction of the cavity 30 through the aligned container opening 74 and the tread element opening 42. The projection 56 extends through the opening 42 in the tread element 32, with the projection outer surface 66 being flush with the tread element outer surface 34. Preferably, the projection 56 is formed of a material that includes mechanical properties, such as shear modulus, which are similar to those of the material of the tread 22. Such similarity ensures that there are no rigid components within the structure of the tire 12, thereby enabling the projection 56 of the tread wear plug 44 to behave like a compatible plug in the tread element 32.

The flange 58 of the tread wear plug 44 preferably is of an elastomeric material that is compatible with the container 38. Once the projection 56 is inserted into the container base opening 74 and the tread element opening 42, the flange 58 engages the base 48 of the container 38 to provide a positive mechanical stop for the tread wear plug 44. The flange 58 also provides a seal about the container base opening 74 to prevent air flow from the tire cavity 30 out through the openings 42 and 74.

Once the tread wear plug 44 is seated in the aligned container opening 74 and the tread element opening 42, and the flange 58 seats against the container base 48, the sensor unit 28 is reinstalled. The sensor unit 28 is inserted into the container 38 through the sensor unit opening 72. Because the container 38 is formed of a flexible material, a wall 76 and lip 78 flex to allow insertion of the sensor unit 28, and then secure the sensor unit in the container. The sensor unit 28 is rotated to enable each sensor electrical contact 54 to contact a respective proximal end 62 of the plug wire 60.

Turning to FIGS. 7 and 8, operation of the tire with a tread wear plug 10 is shown. With particular reference to FIG. 7, the tread wear plug 44 is installed in the tire 12, and the projection outer surface 66 is flush with the tread element outer surface 34. A continuous electrical circuit is formed by the wire 60 and the contact of each proximal wire end 62 with each respective electrical contact 54 of the sensor unit 28. The distal end 64 of the wire 60 is disposed at a predetermined distance 70 (FIG. 5) below the radially outer surface 66 of the projection 56, which corresponds to a minimum recommended tread depth.

Referring to FIG. 8, as the tread 22 wears, the projection 56 of the wear plug 44 also wears. When the tread 22 and the projection 56 wear down to the wire 60, the distal end 64 of the wire 60 breaks, creating a break in the electrical circuit formed by the wire and the contact of each proximal wire end 62 with each respective sensor unit electrical contact 54. The sensor unit 28 senses the break in the electrical circuit, and wirelessly transmits 40 a notice 86 that the electrical circuit has broken and/or that the minimum recommended tread depth has been reached. The notice 86 transmitted 40 by the sensor unit 28 may be sent to a remote processor, such as a processor that is integrated into a vehicle electronic control unit, CAN bus, and/or a cloud-based server. The notice 86, by communicating that the minimum tread depth has been reached, thus indicates when replacement or retreading of the tire 12 should take place.

In this manner, the tire with a tread wear plug 10 indicates tire wear with components that are mounted within the tire 12, and does not require sensors that are external to the tire. The tire with a tread wear plug 10 provides a direct wear sensor system for a vehicle tire 12 that includes a structure which is easy to install in the tire, withstands the operating environment of the tire, accurately indicates tire wear in a repeatable manner, and is capable of transmitting a wear indication to an electronic control system of the vehicle 14.

The present invention also includes a method of determining wear of a tire using a tread wear sensor plug 10, and a method of forming a tire with a tread wear sensor plug 10 for indicating tread depth. Each method includes steps in accordance with the description that is presented above and shown in FIGS. 1 through 8.

It is to be understood that the structure of the above-described tire with a tread wear plug 10 may be altered or rearranged, or components or steps known to those skilled in the art omitted or added, without affecting the overall concept or operation of the invention. For example, a single tread wear plug 44 may be disposed in the tread 22 of the tire 12, or multiple tread wear plugs may be disposed in the tread about the tire. In addition, the tread wear plug 44 may be inserted into the tread element 32 before or after curing of the tire 12. Furthermore, the tread wear plug 44 may include multiple wires 60, each one having a distal end 64 spaced apart from the other wires, which enables the tread wear plug to indicate different wear states of the tread 22, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire with a tread wear sensor plug, comprising:
   the tire including:
   a pair of sidewalls, each one of which extends radially outwardly from a respective bead area to a ground-contacting tread; and
   the tread being formed with a plurality of tread elements and a radially outer surface;
   a sensor unit being mounted to the tire, the sensor unit including a pair of electrical contacts;
   the tread wear sensor plug including:
   a cylindrical projection extending through an opening formed in a selected one of the tread elements;
   a flange; and
   a wire including proximal ends disposed in the flange and a distal end near a radially outer surface of the projection;
   an electrical circuit being formed by each proximal end of the wire electrically contacting a respective one of the sensor unit electrical contacts, whereby when the selected one of the tread elements and the cylindrical projection wear down to the distal end of the wire, the distal end of the wire breaks, thereby breaking the electrical circuit; and
   a notice being transmitted by the sensor unit when the electrical circuit has broken.

2. The tire with a tread wear sensor plug of claim 1, wherein the radially outer surface of the projection is flush with a radially outer surface of the selected one of the tread elements.

3. The tire with a tread wear sensor plug of claim 1, wherein the distal end of the wire is disposed at a set distance below the radially outer surface of the projection, the distance corresponding to a minimum recommended tread depth.

4. The tire with a tread wear sensor plug of claim 1, wherein the sensor unit is mounted to the tire using a container, the container receiving the sensor unit and being attached to an innerliner of the tire by an adhesive.

5. The tire with a tread wear sensor plug of claim 4, wherein the container is formed with a sensor unit opening for removable mounting of the sensor unit to the tire.

6. The tire with a tread wear sensor plug of claim 5, wherein the container is formed of a flexible material and includes a wall and a lip which flex to allow insertion and removal of the sensor unit.

7. The tire with a tread wear sensor plug of claim 6, wherein the opening formed in a selected one of the tread elements is a tread element opening, and a container opening is formed in a base of the container in alignment with the tread element opening.

8. The tire with a tread wear sensor plug of claim 7, wherein the flange engages the base of the container.

9. The tire with a tread wear sensor plug of claim 8, wherein the sensor unit is removed from the container, and when the cylindrical projection of the tread wear plug is seated in the container opening and the tread element opening, and the flange seats against the container base, the sensor unit is reinstalled in the container.

10. The tire with a tread wear sensor plug of claim 1, wherein the projection is formed of a material that includes mechanical properties which are similar to mechanical properties of a material of the tread.

11. The tire with a tread wear sensor plug of claim 1, wherein the sensor unit includes an antenna for wirelessly transmitting the notice to a remote processor.

12. The tire with a tread wear sensor plug of claim 11, wherein the remote processor is integrated into at least one of a vehicle electronic control unit, a CAN bus, and a cloud-based server.

13. The tire with a tread wear sensor plug of claim 1, wherein the tread wear sensor plug further comprises multiple wires, wherein each wire includes a distal end that is spaced apart from the other wires.

* * * * *